(12) United States Patent
Hunukumbure

(10) Patent No.: US 12,058,578 B2
(45) Date of Patent: Aug. 6, 2024

(54) METHODS, APPARATUS, AND SYSTEMS FOR SUPPORTING A HANDOVER

(71) Applicant: Samsung Electronics Co., Ltd., Suwon-si (KR)

(72) Inventor: Mythri Hunukumbure, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 17/766,000

(22) PCT Filed: Sep. 24, 2020

(86) PCT No.: PCT/KR2020/012938
§ 371 (c)(1),
(2) Date: Apr. 1, 2022

(87) PCT Pub. No.: WO2021/066388
PCT Pub. Date: Apr. 8, 2021

(65) Prior Publication Data
US 2022/0353766 A1   Nov. 3, 2022

(30) Foreign Application Priority Data
Oct. 3, 2019 (GB) ...................................... 1914294

(51) Int. Cl.
*H04W 36/08* (2009.01)
*H04L 1/1812* (2023.01)
*H04W 36/00* (2009.01)

(52) U.S. Cl.
CPC ........... *H04W 36/08* (2013.01); *H04L 1/1812* (2013.01); *H04W 36/0058* (2018.08)

(58) Field of Classification Search
CPC ............ H04L 1/1812; H04W 36/0016; H04W 36/0058; H04W 36/08
(Continued)

(56) References Cited

U.S. PATENT DOCUMENTS 8,811,336 B2  8/2014 Chun et al.
10,097,316 B2 10/2018 Damnjanovic et al.
(Continued)

FOREIGN PATENT DOCUMENTS

EP      2996381 A1    3/2016
WO   2017/062211 A1    4/2017

OTHER PUBLICATIONS

European Office Action dated Feb. 9, 2024, issued in European Patent Application No. 20873312.1.
(Continued)

*Primary Examiner* — Robert J Lopata
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method of a first base station for supporting a handover procedure, the method comprising determining to perform a handover of a user equipment, UE, to a second base station; determining whether Hybrid automatic repeat request, HARQ, is to be used after the handover is completed; and based on determining that HARQ is to be used, notifying the UE that HARQ is to be used after the handover is completed and notifying the second base station that HARQ is to be used after the handover is completed.

15 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0036808 A1* | 2/2014 | Pelletier | H04W 52/146 |
| | | | 370/329 |
| 2016/0080983 A1 | 3/2016 | Uchino et al. | |
| 2021/0105693 A1* | 4/2021 | Tripathi | H04W 84/06 |
| 2022/0014315 A1* | 1/2022 | Kong | H04L 1/1812 |
| 2022/0158770 A1* | 5/2022 | Hong | H04L 1/1671 |
| 2022/0200741 A1* | 6/2022 | You | H04L 1/1825 |
| 2023/0015847 A1* | 1/2023 | Li | H04W 36/0072 |
| 2024/0154775 A1* | 5/2024 | Ying | H04L 5/0053 |

OTHER PUBLICATIONS

Huawei, HiSilicon, CAICT; Discussion on HARQ for NTN; 3GPP TSG RAN WG1 Meeting #98, R1-1908050, Aug. 17, 2019, Prague, Czech Republic.
Samsung; HARQ Procedure in NTN; 3GPP TSG RAN WG1 Meeting #98, R1-1908489, Aug. 16, 2019, Prague, Czech Republic.
Great Britain Office Action dated Mar. 2, 2020, issued in a counterpart GB Application No. 914294.2.
Extended European Search Report dated Aug. 4, 2022, Issued In a counterpart European Application No. 20873312.1.
MediaTek Inc.; Summary of 7.2.5.4 on more delay-tolerant retransmission mechanisms in NR-NTN; 3GPP TSG RAN WG1 Meeting #98; R1-1909783; Sep. 3, 2019, Prague, Czech Republic.

* cited by examiner

[Fig. 1]
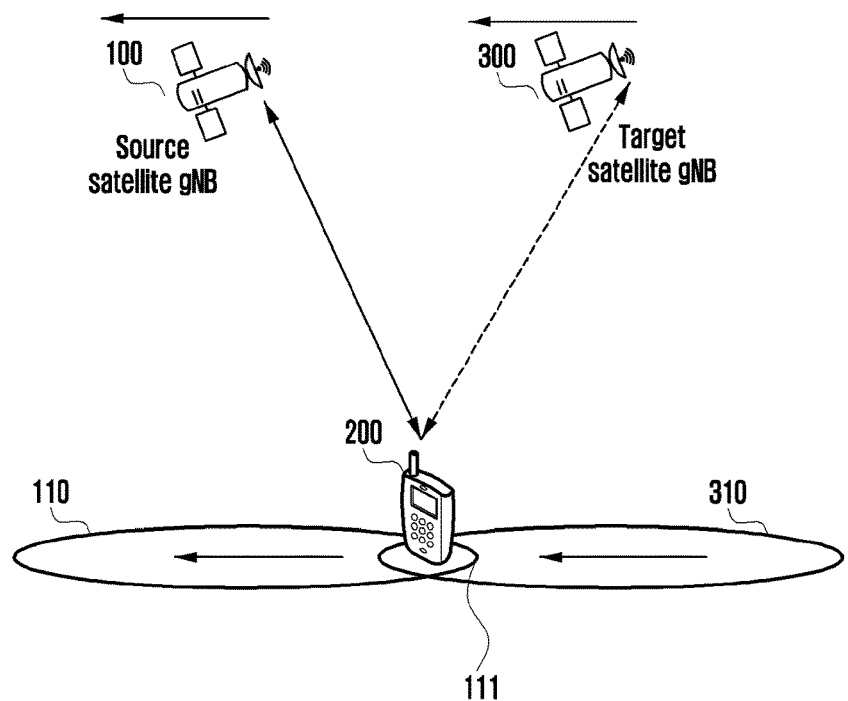
[Fig. 2]
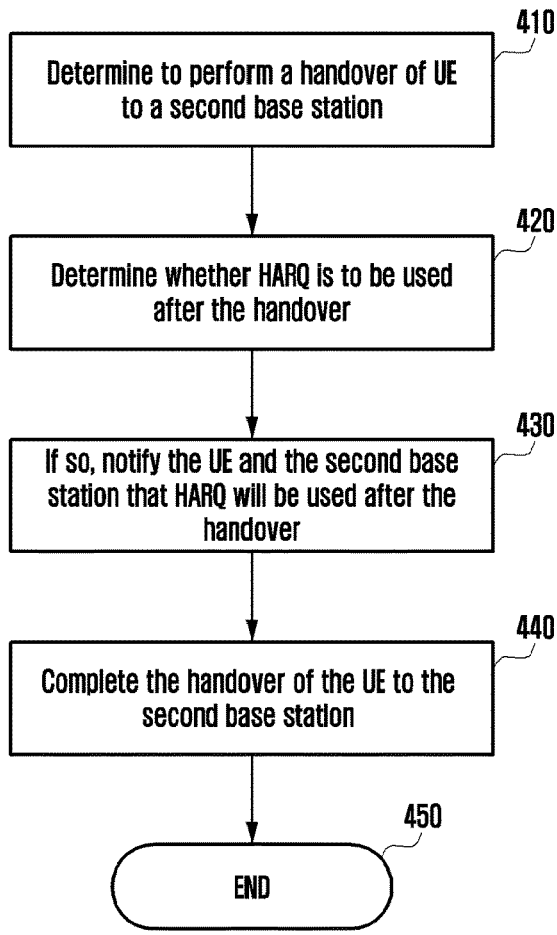

[Fig. 3]
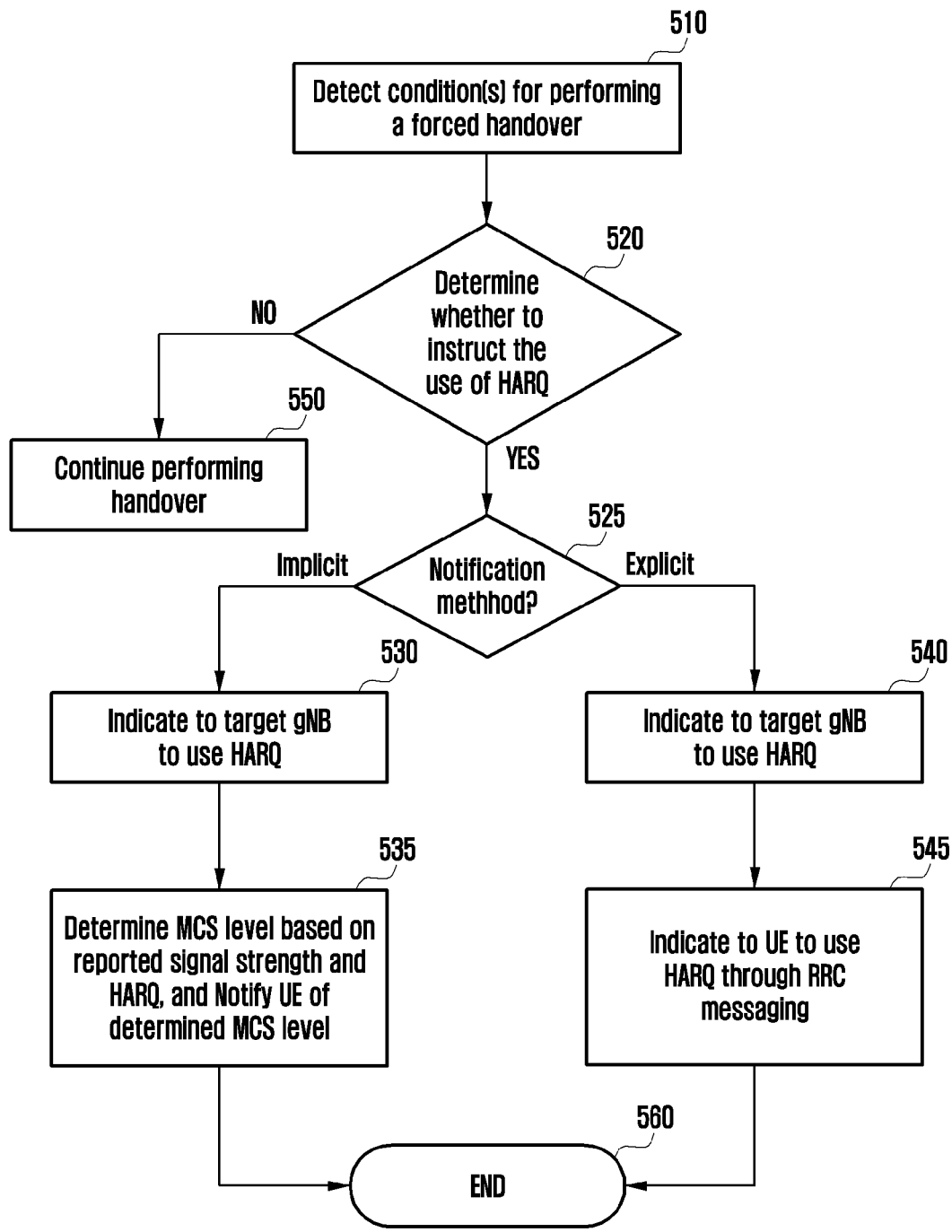

[Fig. 4]
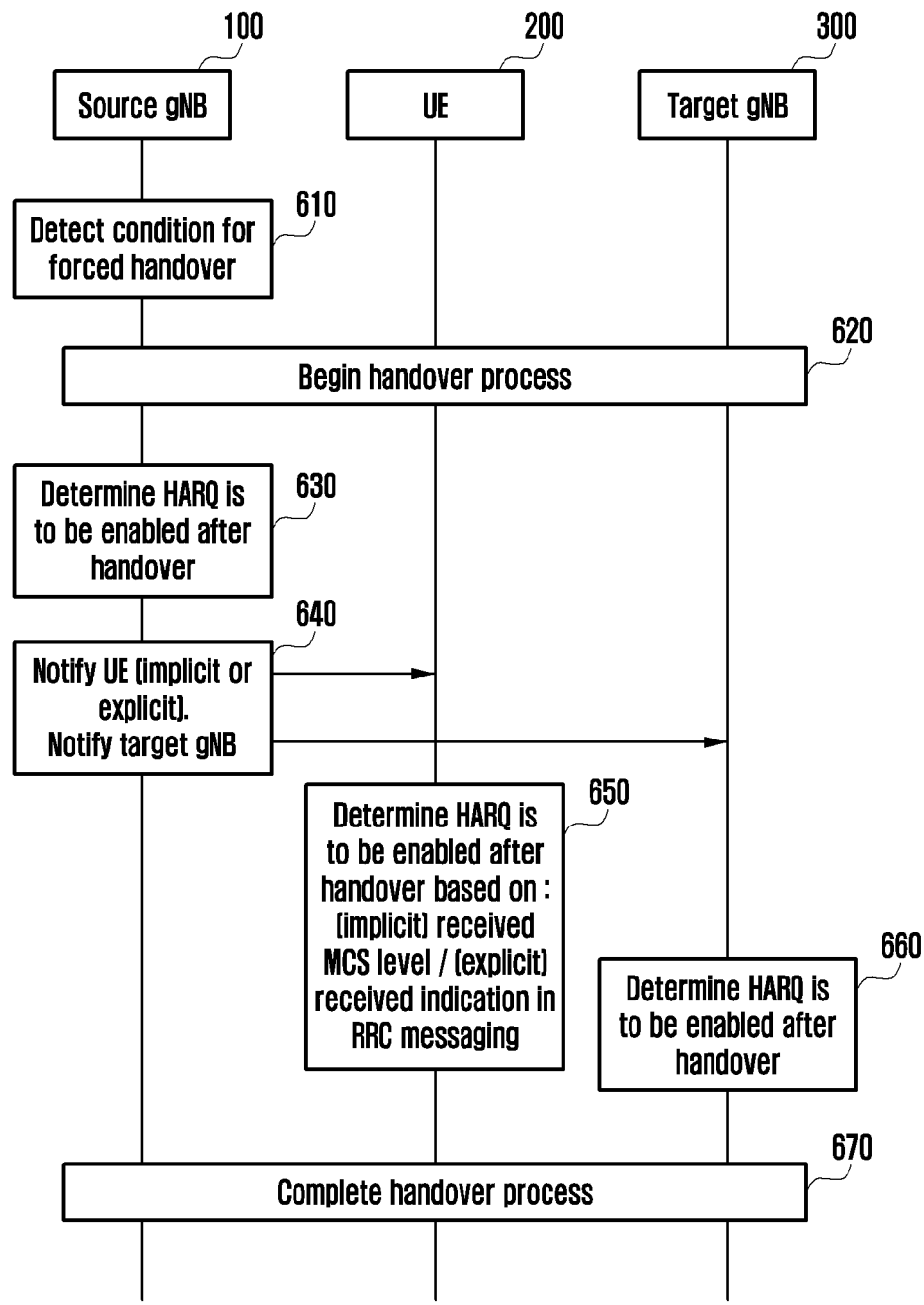

[Fig. 5]
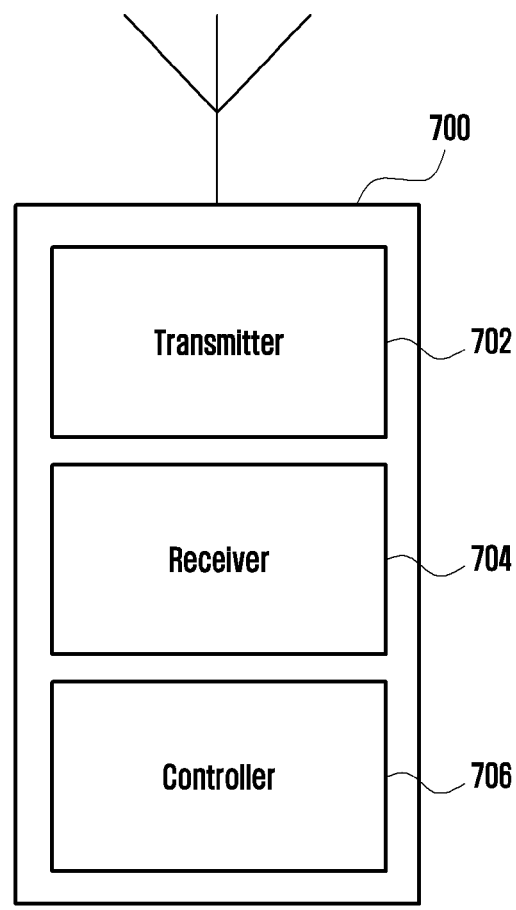

[Fig. 6]
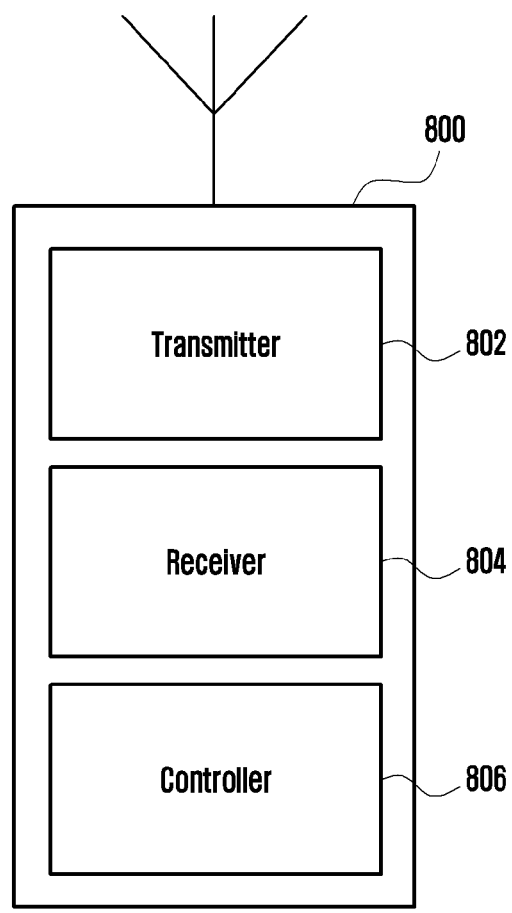

METHODS, APPARATUS, AND SYSTEMS FOR SUPPORTING A HANDOVER

TECHNICAL FIELD

The present disclosure relates to methods, apparatus, and systems for supporting a handover in a wireless network. In particular, certain embodiments of the present disclosure relate to methods, apparatus, and systems for supporting a handover of a user equipment from a first base station to a second base station in a wireless network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

Wireless or mobile (cellular) communications networks in which a mobile terminal (UE, such as a mobile handset) communicates via a radio link with a network of base stations, or other wireless access points or nodes, have undergone rapid development through a number of generations. The 3rd Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G-NR) or simply NR. NR is designed to support the wide variety of services and use case scenarios envisaged for 5G networks, though builds upon established LTE technologies. One aspect of 5G NR is the use of Non-Terrestrial Networks (NTN) for providing services to User Equipment (UE). NTNs refer to networks, or segments of networks, using an airborne or spaceborne vehicle for transmission. Spaceborne vehicles may include satellites in Low Earth Orbits (LEO), Medium Earth Orbits (MEO), Geostationary Earth Orbit (GEO) and Highly Elliptical Orbits (HEO). Airborne vehicles include High Altitude Platforms (HAPs) comprising Unmanned Aircraft Systems (UAS)—including tethered UAS, Lighter than Air UAS and Heavier than Air UAS—all operating at altitude. In an NTN, a spaceborne vehicle or an airborne vehicle may act as a base station or a relay to a ground transmission station for a cell providing network services to a UE. An NTN may also include one or more terrestrial base stations in combination with a non-terrestrial base station such as an LEO satellite or an MEO satellite configured as a base station.

Accordingly, an aspect of an NTN is that one or more base stations are in motion relative to the earth. For example, an NTN may include a constellation of LEO satellites, each of which is moving over the Earth. It may be expected that an NTN is provided with the aim of providing continuous coverage to a UE which subscribes to the service provided by the NTN. Accordingly, movement of a base station in an NTN to which a UE is connected will eventually result in the UE being located outside of the coverage footprint of the moving base station, and so handover should be performed before the UE leaves the coverage footprint. This is, in effect, a time bound handover, referred to as a 'forced handover'.

Solution to Problem

According to a first aspect of the present disclosure there is provided a method of a first base station for supporting a handover procedure, the method comprising: determining to perform a handover of a user equipment, UE, to a second base station; determining whether Hybrid automatic repeat request, HARQ, is to be used after the handover is completed; and based on determining that HARQ is to be used, notifying the UE that HARQ is to be used after the handover is completed and notifying the second base station that HARQ is to be used after the handover is completed.

In certain embodiments of the present disclosure, the handover is a time limited handover or a forced handover.

In certain embodiments of the present disclosure, determining to perform handover comprises determining the second base station based on information received from the UE; and the information comprises measurements of at least one neighboring cell signal strength, wherein the measurements includes a measurement of signal strength of a cell corresponding to the second base station.

In certain embodiments of the present disclosure, notifying the UE that HARQ is to be used after handover is completed comprises one of: transmitting, to the UE, an indication that HARQ is to be used after the handover is completed; and determining configuration information based on the information of the signal strength of the cell corresponding to the second base station and a HARQ process, and transmitting, to the UE, the configuration information.

In certain embodiments of the present disclosure, the indication is included in a Radio Resource Control, RRC, message, wherein the RRC message is transmitted to the UE after the first base station transmits a handover request to the UE; and the configuration information is a Modulation Coding Scheme, MCS, level which is transmitted to the UE through a Downlink Channel Information, DCI, message, wherein the DCI message is transmitted to the UE after the first base station transmits a handover request to the UE.

In certain embodiments of the present disclosure, determining the configuration information comprises setting the MCS level to be higher than an MCS level determined based on only the information of the signal strength of the cell corresponding to the second base station.

In certain embodiments of the present disclosure, the one of the RRC messaging and the MCS level is transmitted through a Physical Downlink Control Channel, PDCCH.

In certain embodiments of the present disclosure, determining whether HARQ is to be used comprises determining the signal strength of the cell corresponding to the second base station to be less than a threshold.

In certain embodiments of the present disclosure, the threshold is based on a signal strength of a cell corresponding to the first base station.

In certain embodiments of the present disclosure, the method further comprises notifying the second base station that HARQ is to be used after the handover is completed.

In certain embodiments of the present disclosure, determining to perform handover comprises: transmitting, to the second base station, a handover request; and receiving, from the second base station, an indication of acceptance of the handover request.

In certain embodiments of the present disclosure, determining to perform the handover comprises determining to perform the handover if at least one of: based on a motion of the first base station, it is determined that the UE will no longer be within a coverage footprint of the first base station before a first predetermined period of time expires; it is determined that a second predetermined period of time expires, wherein the second predetermined period of time is determined based on the motion of the first base station and a size of the coverage footprint of the first base station in the direction of the motion of the first base station; and it is determined that the UE is within a predetermined distance from a trailing edge of the coverage footprint of the first base station.

According to a second aspect of the present disclosure there is provided a method of a user equipment, UE, for supporting a handover procedure, the method comprising: receiving, from a first base station, a notification that Hybrid automatic repeat request, HARQ, is to be used after a handover to a second base station is completed; transmitting, to the second base station, a handover complete message; and communicating with the second base station with HARQ enabled.

In certain embodiments of the present disclosure, receiving the notification that HARQ is to be used after a handover to a second base station is completed comprises receiving, from the first base station, an indication that HARQ is to be used after the handover is completed.

In certain embodiments of the present disclosure, receiving the notification that HARQ is to be used after the handover to the second base station is completed comprises: receiving, from the first base station, a Modulation Coding Scheme, MCS, level; determining a probable MCS level based on information of the signal strength of a cell corresponding to the second base station; comparing the received MCS level with the probable MCS level; and based on the comparison, determining that HARQ is to be used after the handover is completed; and wherein the information of the signal strength is measured by the UE.

According to a third aspect of the present disclosure there is provided a method of a second base station for supporting a handover procedure, the method comprising: receiving, from a first base station, an notification that Hybrid automatic repeat request, HARQ, is to be used after handover of a user equipment, UE, from the first base station to the second base station is completed; receiving, from the UE, a handover complete message; and communicating with the UE with HARQ enabled.

According to a fourth aspect of the present disclosure there is provided a method of a system for supporting a handover procedure, the system comprising the first base station, the UE, and the second base station, the method comprising: determining, by a first base station, to perform handover of a user equipment, UE, to a second base station; determining, by the first base station, whether Hybrid automatic repeat request, HARQ, is to be used after the handover is completed; based on determining that HARQ is to be used, notifying, by the first base station, the UE that HARQ is to be used after the handover is completed and notifying, by the first base station, the second base station that HARQ is to be used after the handover is completed; receiving, by the UE from the first base station, a first notification that HARQ is to be used after the handover is completed; receiving, by the second base station from the first base station, a second notification that HARQ is to be enabled after the handover is completed; transmitting, by the UE to the second base station, a handover complete message; receiving, by the second base station from the UE, the handover complete message; and communicating, by the second base station and the UE, with HARQ enabled.

In certain embodiments of the present disclosure, the first base station is a Low Earth Orbit, LEO, satellite next generation node B (gNB), a Medium Earth Orbit, MEO, satellite gNB, a High Altitude Platform, HAP, gNB, or a nomadic gNB; and the second base station is a ground-based gNB, a LEO satellite gNB, a MEO satellite gNB, a HAP gNB or a nomadic gNB.

According to a fifth aspect of the present disclosure there is provided a base station arranged the perform the method of the first aspect.

According to a sixth aspect of the present disclosure there is provided a user equipment, UE, arranged to perform the method of the second aspect.

According to a seventh aspect of the present disclosure there is provided a base station arranged to perform the method of the third aspect.

According to an eighth aspect of the present disclosure there is provided a system arranged to perform the method of the fourth aspect.

According to another aspect of the present disclosure there is provided a computer readable storage medium having stored thereon computer executable instructions which when executed by a computer cause the computer to perform the above method.

Another aspect of the present disclosure provides a computer program comprising instructions arranged, when executed, to implement a method and/or apparatus in accordance with any one of the above-described aspects. A further aspect provides machine-readable storage storing such a program.

Advantageous Effects of Invention

It is an aim of certain examples of the present disclosure to address an issue of QoS reduction for a UE after a forced handover of the UE.

BRIEF DESCRIPTION OF DRAWINGS

Embodiments of the present disclosure are further described hereinafter with reference to the accompanying drawings, in which:

FIG. 1 illustrates an example of a handover situation in an NTN in accordance with an embodiment of the present disclosure.

FIG. 2 illustrates a method of a source base station in accordance with another embodiment of the present disclosure.

FIG. 3 illustrates a method of a source next generation node B (gNB) in accordance with another embodiment of the present disclosure.

FIG. 4 illustrates a method of an NTN comprising a source gNB, a UE and a target gNB.

FIG. 5 illustrates an example structure of a gNB in accordance with an example of the present disclosure.

FIG. 6 illustrates an example structure of a UE in accordance with an example of the present disclosure.

MODE FOR THE INVENTION

Examples in accordance with the present disclosure will now be described in the context of a 5G wireless communication network. Of course, it will be appreciated that the various examples and embodiments discloses herein may be applied to other types of wireless communication network.

Additionally, one or more embodiments will now be described in which reference is made to one or more of a source gNB, a target gNB and a UE. The source gNB may be a LEO satellite gNB, a MEO satellite gNB, or a HAP gNB etc, however the present disclosure is not limited to these entities. In general, the source gNB may be considered to be a base station which is in motion such that the forced handover situation described below will arise. Furthermore, the target gNB may also be a LEO satellite gNB, a MEO satellite gNB, or a HAP gNB etc., however again the present disclosure is not limited to this and it will be appreciated that another apparatus in accordance with an example of the present disclosure may be configured as a target gNB.

Furthermore, although the present disclosure is largely focusing on LEO or MEO satellite constellations, it can be equally applicable in other NTN and terrestrial communication scenarios and their hybrids as well. For example the handover of a UE can be between a LEO or MEO satellite and a ground based gNB, between a LEO satellite and a MEO satellite or a LEO/MEO satellite and a HAP. Also within the terrestrial systems, nomadic cells are increasingly being discussed. These cells can be mounted on vehicles, for emergency communication scenarios for example. In this case, the proposed solution can be enacted for handover between two nomadic gNBs or between a nomadic gNB and a ground based gNB. In other words, the present disclosure is not limited to NTNs but may instead be extended to apply to terrestrial networks in which there are one or more moving base stations.

In an exemplary wireless network in which a base station is providing network services to a UE, a handover may be performed to move a UE from one cell to another cell. For example, a first enhanced Node B (eNB) corresponding to a first cell may be providing network services to the UE. The first eNB may regularly request information from the UE of neighboring cell signal strengths—where the information may be, for example, one or more of RSSI (Received Signal Strength Indicator) measurement information, RSRP (Reference Signal Received Power) measurement information, RSRQ (Reference Signal Received Quality) measurement information. In some cases, according to a setting, such a request may only be made in relation to neighboring cells having signal strengths above a threshold.

If the first eNB determines, based on information received from the UE, that a neighboring cell provides a measurement of signal strength greater than the signal strength of the cell of the first eNB, then this neighboring cell, corresponding to a second eNB, becomes a target for handover of the UE and the first eNB performs a handover process.

In an exemplary handover process, the first eNB transmits a handover request to the second eNB. The second eNB determines if resources are available for providing services to the UE and, if so, indicates handover acceptance to the first eNB. The first eNB further issues a handover request to the UE and sends, to the second eNB, any unacknowledged packets which are stored in a buffer of the first eNB. The UE synchronizes to the second eNB and accesses uplink resources, and transmits a handover complete message to the second eNB. The second eNB informs the core network that the handover has taken place, such that the core network may execute a 'late path switch'. As a result, the core network link to the first eNB is released and new packets from the core network will be directed to the second eNB instead.

The afore-described handover process is considered to exemplify a typical handover process for LTE and also for 5G-NR, but it will be appreciated that other handover processes, comprising additional or a different combination of steps, may exist in the art. In the below description of various embodiments of the present disclosure, reference to a typical handover process or a standard handover process may be seen to refer to the afore-mentioned described handover process, however it will be appreciated that such other handover processes may also be implemented in the below.

Referring now to FIG. 1, an NTN in accordance with an embodiment of the present disclosure is illustrated. Here, a constellation of satellites of the NTN includes two LEO satellites configured as gNBs—a source (satellite) gNB 100 and a target (satellite) gNB 300—and a UE. The source gNB 100 corresponds to cell 110, while the target gNB corresponds to cell 310. In this embodiment, the source gNB 100 and the target gNB 300 are moving relative to the Earth, as indicated by the corresponding arrows, and as such the coverage footprint of each satellite (that is, the area covered by each respective cell) is moving across the surface of the Earth, as indicated by the corresponding arrows.

It will be appreciated that, based on the speed of the source gNB 100, the source gNB 100 may determine the amount of time required for its coverage footprint to have moved such that the coverage footprint has been displaced, in the direction of motion, by a distance equal to the length of the coverage footprint in the direction of motion. In other words, the source gNB 100 may determine the amount of time which a point within a certain coverage footprint will be covered by the source gNB 100; and so may determine the amount of time which a UE included in the certain coverage footprint, to which the source gNB 100 is providing packets from the core network, may remain in the certain coverage footprint.

The UE 200 is in communication with the source gNB 100, with the source gNB 100 providing network services to the UE 200. In view of the movement of the source gNB 100 with respect to the UE, it is expected that the coverage footprint of the source gNB 100 will move such that the UE 200 will eventually no longer be within this coverage footprint. In certain embodiments, the source gNB 100 may determine, or estimate, the amount of time until the UE 200 will no longer be within the coverage footprint. As a result of this movement by the source gNB 100, a situation may arise in which a time bound 'forced handover' must be performed, to ensure continuous coverage in the NTN (that is, to ensure there is no loss of service to the UE 200).

In a forced handover situation, the source gNB 100 performs handover of the UE 200 to the target gNB 300 even though the signal strength of the cell corresponding to the target gNB 300 is below that of the source gNB.

Accordingly, in contrast to the handover process described above (where handover of a UE to a second base station is triggered if the first base station determines that the second base station has a higher signal strength than the first base station) in a forced handover process the relative signal strength between the first and second base stations may not be taken into account, but rather the forced handover is triggered by some other factor or predetermined condition. In certain embodiments of the present disclosure, this other factor or predetermined condition is related to the movement of the first base station, and in particular to the corresponding movement of the coverage footprint of the first base station such that a location within the coverage footprint will soon lie outside the coverage footprint.

In certain embodiments of the present disclosure, the factor or predetermined condition may be detecting or determining, by the source gNB, that: the UE 200 is within a predetermined distance from the edge of the coverage footprint of the source gNB 100; the UE 200 will fall outside the coverage footprint of the source gNB 100 in less than a predetermined period of time (for example, this may assume that UE 200 is relatively stationary compared to the source gNB 100); the strength of the signal received at the UE 200 from the source gNB 100 will drop below a predetermined threshold; or a specific location within the coverage footprint will no longer be within the coverage footprint within a specific amount of time. It will be appreciated that this is a non-limiting list, and so various other predetermined conditions may exist, as are more-generic predetermined conditions such as, for example, triggering a forced handover based on the movement of the source gNB 100.

Essentially, according to certain embodiments, a forced handover procedure is triggered when the movement of the source gNB 100 means that the UE 200 will be outside the coverage footprint of the source gNB 100 within a certain amount of time, and so handover of the UE 200 must be performed before the opportunity to do so is lost and the UE 200 is outside of the coverage footprint. If the UE 200 is not handed over before this time, then the UE 200 may lose connection with the network, which may be detrimental to communications and user experience.

For example, as illustrated in FIG. 1, the UE 200 is located in an overlap between cell 110 and cell 310, and close to a trailing edge 111 of cell 110 such that UE 200 will soon be outside the area of cell 110 due to the movement of source gNB 100. Even located as it is, however, it may be the case that UE 200 still measures higher signal strength for cell 110 than for cell 310, and so a condition for performing a typical handover (such as described above) may not be met. However, if the source gNB 100 does not perform handover to the target gNB 300, then the UE 200 will move outside the coverage footprint of cell 110 and may experience an undesirable loss of service. Accordingly, the source gNB 100 is forced to perform a handover to the target gNB 300. While this addresses the problem of the UE 200 losing connection with the network, a problem now arises in that the target gNB 300, by having lower signal strength than the source gNB 100, may provide a worse service to the UE 200; that is, after handover the Quality of Service (QoS) of the UE 200 may decrease.

Additionally, a further problem arises in that, due to a propagation delay experienced by a non-terrestrial base station or gNB such as an LEO satellite, MEO satellite etc., an additional delay may be incurred in enabling an error correction measure, for example Hybrid automatic repeat request (HARQ), to address the reduced QoS resulting from the lower signal strength of the cell 310 of the target gNB 300. That is, in view of the lower signal strength of the target gNB 300, HARQ may be enabled to provide a more robust link between UE 200 and the target gNB 300, however the process to enable HARQ requires signalling between the UE 200 and the target gNB 300 and so the propagation delay means that this process will incur delays.

For example, a LEO satellite at 600 km altitude may experience a 2 ms one-way delay. As such, after handover of the UE 200 to the target gNB 300, and taking the example of the target gNB 300 being such an LEO satellite, a number of extra signalling steps would be required for HARQ to be enabled for communications between UE 200 and the target gNB 300, and the performance of these extra steps will be hindered by the propagation delay. Therefore, not only may QoS decrease in view of handing over UE 200 to a cell or gNB having a lower signal strength, but enabling HARQ will take additional time due to the delay, thereby contributing to the QoS issue.

Certain embodiments of the present disclosure address the above-mentioned QoS issue(s) by notifying, or instructing, the UE 200 that HARQ is to be used, or enabled, after handover to the target gNB 300, where said notification is from the source gNB 100. The source gNB 100 may also notify, or instruct, the target gNB 300 that HARQ is to be used, or enabled, from the beginning of communications between UE 200 and the target gNB 300 (for example, the transmission of core network packets from the target gNB 300 to the UE 200) after the handover is completed. As a result, according to certain embodiments, immediately after handover is complete, HARQ is enabled for packets sent to the UE 200 from the target gNB 300, thereby mitigating a reduction of QoS arising due to the signal strength of the target gNB 300 being lower than the signal strength of the source gNB 100.

According to certain embodiments of the present disclosure, the notifying, to the UE 200 and the target gNB 300, that HARQ should be enabled after handover is performed in parallel to the handover procedure. According to certain embodiments, the procedure of determining whether to notify the UE 200 to enable HARQ after the handover to the target gNB 300, and the notifying itself, does not affect the handover procedure or require any changes in the handover procedure as defined in the related standard. As such, said embodiments may be seen as supporting the handover procedure, but not modifying it.

In certain embodiments, the determination of whether to enable HARQ and any resulting notification to enable HARQ is initiated once the target gNB 300 has indicated acceptance of the handover request (referring to the handover procedure described previously). Accordingly, these operations are only performed once the source gNB 100 has established that the target gNB 300 accepts the handover, and so a waste of resources may be prevented compared to situations where these operations are performed and then it is later established that the target gNB cannot accept the handover.

In certain embodiments, the notifying is performed/completed before the handover process is complete, so that HARQ is enabled from the first packets transmitted from the target gNB 300 to the UE 200 after the handover is completed.

According to certain embodiments of the present disclosure, there are various ways by which the source gNB 100 may notify, or instruct, the UE 200 that HARQ is to be used for communication with the target gNB 300 after handover.

In particular, according to certain embodiments, the source gNB 100 may explicitly notify the UE 200 that HARQ should be enabled after handover. Such a step of explicitly notifying the UE 200 may be, or include, a step of transmitting an indication that HARQ will be used after the handover, to the UE 200. For example, the indication may be included in radio resource control (RRC) messaging from the source gNB 100 to the UE 200. The source gNB 100 therefore explicitly notifies the UE 200 that the UE 200 should enable HARQ for communications with the target gNB 300 after the handover. The RRC messaging may be conveyed through the Physical Downlink Control Channel (PDCCH). In certain embodiments, this explicit notification may be sent to the UE 200 after the source gNB 100 has issued a handover request to the UE 200.

Furthermore, according to certain other embodiments, the source gNB 100 may implicitly notify the UE 200 that HARQ should be used after handover. Such a step of implicitly notifying the UE 200 may include a step of determining (or estimating or calculating), by the source gNB 100, a modulation coding scheme (MCS) level in consideration of the signal strength measurements of cell 310 (the cell of the target gNB 300) and a HARQ process to be used (such as a number of repetitions, or other information regarding the HARQ process to be used).

For example, an MCS level determined along these lines may be higher than it would be if determined based solely on the signal strength measurements of cell 310. Statistical values of the probable MCS level shifts achievable by a given number of HARQ repetitions are known in the art, and so the source gNB 100 may use these statistical values to determine the MCS level in consideration of the signal strength measurements and the HARQ process. That is, the source gNB 100 may use information related to the statistical values of the probable MCS level shifts to determine a higher MCS level, as will be discussed further below. The step of implicitly notifying the UE 200 may further include transmitting, or notifying, the MCS level to the UE 200 by the source gNB 100. In an example, said notifying of the MCS level may be through Downlink Channel Information (DCI). This may also be conveyed through the PDCCH. In certain embodiments, this implicit notification may be sent to the UE 200 after the source gNB 100 has issued a handover request to the UE 200.

In certain embodiments of the present disclosure, the UE 200 determines or estimates a probable MCS level for the cell 310 of the target gNB 300. Accordingly, upon obtaining the MCS level from the source gNB 100, the UE 200 may perform a comparison between the received MCS level and the estimated MCS level, from which the UE 200 may determine that HARQ is to be enabled for the very first transmissions from the target gNB 300. For example, the UE 200 may determine that the MCS level obtained from the source gNB 100 is higher than the probable MCS level estimated by the UE 200 itself, and the UE 200 may be configured to infer, from this result, that HARQ will be enabled immediately after handover.

Further to the above, it will of course be appreciated that the source gNB 100 may, according to certain embodiments, use an explicit notification method in some circumstances and an implicit notification method in other circumstances, and so may be configured to use/implement both methods. For example, the source gNB 100 may be configured to use the explicit notification method for a first type of UE and the implicit notification method for a second type of UE, or the source gNB 100 may be instructed to use one of the explicit and implicit notification methods by the Radio Resource Management (RRM). As another example, the source gNB 100 may be configured to choose a notification method to use based on a factor related to the source gNB 100, such as its current resource levels (overhead) utilized for control signalling etc.

As well as notifying the UE that HARQ will be enabled from the moment that the handover to the target gNB 300 is complete, the source gNB 100 may also notify, or instruct, the target gNB 300 that HARQ will be enabled after the handover is complete. For example, the source gNB 100 may transmit, to the target gNB 300 over an x2 link established between the two gNBs, an indication that HARQ will, or should, be enabled after handover.

FIG. 2 illustrates a method in accordance with an embodiment of the present disclosure, as performed by a first base station.

In step 410, the first base station determines to perform a handover of a UE to a second base station. In an example, the first base station may be LEO satellite gNB 100 of FIG. 1, the UE may be UE 200 of FIG. 1, and the second base station may be LEO satellite gNB 300 of FIG. 1.

In determining to perform the handover, the first base station may have performed a number of other operations first. For example, the first base station may be determined that a condition is met for performing a forced handover, such as detecting that the UE will no longer be covered by the coverage footprint of the first base station after a predetermined period of time has elapsed. Furthermore, prior to determining to perform the handover, the first base station may have received information from the UE, and the second base station may have been selected on the basis of this information. For example, the information may be measurements of signal strength of at least one neighboring cell, including a cell corresponding to the second base station.

In step 420, the first base station determines whether HARQ is to be used, or enabled, after the handover to the second base station.

In determining whether HARQ is to be used, the first base station may determine whether a signal strength of the second base station, or cell thereof, meets a certain condition, such as a predetermined threshold. If not, then the first base station may determine that HARQ is to be used.

Furthermore, in certain embodiments, prior to determining whether HARQ is to be used after handover, the first base station may have already initiated the handover process by transmitting, to the second base station, a handover request. If the second base station responds negatively, then step 420 may not be performed because the second base station is not a valid target. The first base station may then attempt to identify a third base station as a potential handover target, based on information from the UE. In such embodiments, step 420 is performed if the second base station accepts the handover request.

In step 430, based on the determination of whether HARQ is to be used after the handover is completed, the first base station notifies the UE that HARQ is to be used after the handover and notifies the second base station that HARQ is to be used after the handover. For example, this will follow a determination that HARQ should be enabled.

The UE may be notified that HARQ will be used by one of various different methods, for example by an implicit notification method or an explicit notification method. These two methods will be described in more detail below in relation to FIG. 3, with a discussion of said methods being found above also—and it will be appreciated that the concept(s) described therein may readily be applied to the system of FIG. 2.

In addition to notifying the UE, in certain embodiments the first base station also notifies the second base station that HARQ will be used after the handover. In certain embodiments, the first base station may notify the UE that HARQ will be enabled after handover is completed after the first base station has transmitted a handover request to the UE.

In step 440, after having notified the UE, the handover is completed. It will be appreciated that completion of the handover may not involve the first base station, depending on whether or not the first base station has already completed its required operations for performing the handover—in which case this step refers to waiting for one or more of the other entities in the system to complete the handover process.

FIG. 3 illustrates a method in accordance with another embodiment of the present disclosure, as performed by a source gNB 100.

In step 510, the source gNB 100 detects a condition for performing a forced handover of the UE 200 to the target gNB 300.

In certain embodiment, as described above, the source gNB 100 may determine, based on the motion of the source gNB 100, impending expiration of a determined (or estimated) period of time in which the coverage footprint of the source gNB 100 will have moved by a distance equal to the size of the coverage of footprint in the direction of motion of the source gNB 100; and so determine to that a forced handover is to be performed. In other embodiments, the source gNB 100 will determine that its coverage footprint will soon (as in, within a predetermined period of time) no longer include UE 200, and so determine to perform a forced handover.

Prior to, or as a part of, step 510, the source gNB 100 may receive, from the UE 200, signal strength measurement information for at least one neighboring cell including a cell corresponding to the target gNB 300. The source gNB may determine the target gNB 300 as the base station of the at least one neighboring cell having a highest signal strength based on the signal strength measurement information.

In step 520, the source gNB 100 determines whether to instruct the UE 200 and the target gNB 300 to use HARQ once the handover is performed/completed.

According to certain embodiments, the source gNB 100 may determine that the signal strength of the target gNB 300, or the cell corresponding to the target gNB 300, is lower than a threshold. This threshold may be set based on the signal strength of the source gNB 100, or the cell thereof; and so it may be determined to instruct that HARQ will be used after the handover is performed if it is determined that the signal strength of the cell of the target gNB 300 is less than the signal strength of the cell of the source gNB 100.

Prior to step 520, the method may include one or more steps related to a standard handover procedure. For example, before performing step 520, the source gNB 100 may transmit, to the target gNB 300, a handover request. The method may then only proceed to step 520 if the target gNB 300 indicates acceptance of the handover request. This may not be the case if the target gNB 300 does not have the resources to support handover of the UE 200. If the target gNB 300 accepts the handover request transmitted by the source gNB 100, then the method may proceed to step 520. In contrast, if acceptance of the handover request is not received from the target gNB 300, then the source gNB 100 may have to determine another target gNB for handover—if another target gNB is determined, then the method may proceed to step 520 on the basis of this other target gNB being that to which the UE 200 is to be handed over to.

If it is determined not to instruct the use of HARQ for communications between the UE 200 and the target gNB 300 after the handover is complete, then the method proceeds to step 550 in which the source gNB 100 continues to perform the handover process in accordance with the standard, without instructing to use HARQ. For example, if it is determined that, at the time when the performing of a forced handover is triggered, the signal strength of the cell of the target gNB 300 is higher than the threshold, the source gNB 100 determines there is no need to enable HARQ after the handover and so a handover process is performed without any need to enable HARQ immediately after handover.

As described above, a typical handover process, as performed by the source gNB 100, includes: (assuming that the target gNB 300 has indicated acceptance of the handover request) transmitting a handover request to the UE 200, and sending any unacknowledged packets stored in a buffer of the source gNB 100 to the target gNB 300 through an ×2 link. The target gNB 300 may inform the core network about the handover. The UE 200 will synchronize to the target gNB 300 and access uplink resources, and transmit a handover complete message to the target gNB 300; while the core network, once informed about the handover, will release the network link to the source gNB 100 and direct new packets to the target gNB 300.

If it is determined that HARQ is to be enabled after handover, the method proceeds to one of steps 525, 530 or 540.

It will be appreciated that step 525 is optional, depending on whether the source gNB 100 (or the system as a whole) is configured to notify the UE 200 about the enabling of HARQ using: (i) always the implicit method (in which case step 525 is unnecessary), (ii) always the explicit method (in which case step 525 is unnecessary), or (iii) one of the implicit method and the explicit method (in which case step 252 may be necessary). In step 525 (if performed), it will be appreciated that, in certain embodiments of the present disclosure, the source gNB 100 may be configured to determined which of the implicit method and the explicit method to use based on configuration information, or based on an instruction from the RRM.

If the implicit notification method is to be used, in step 530 the source gNB 100 indicates to the target gNB 300 that HARQ should be used for communication with the UE 200 once the handover is complete. For example, the source gNB 100 may transmit, to the target gNB 200 through an ×2 link, an indication that HARQ is to be enabled after handover so that HARQ is enabled for packets sent from the target gNB 300 to the UE 200 immediately after handover.

Additionally, in step 535, the source gNB 100 determines, or sets, an MCS level based on (i) the signal strength from the cell of the target gNB 300 to the UE 200 (as reported by the UE 200 in the measurement information and (ii) a HARQ process. The HARQ process may simply refer to the determination to enable HARQ, and so determining the MCS level also based on the HARQ process may simply mean modifying the result of determining the MCS level based on the signal strength of the cell of the target gNB 300 in some predetermined manner (for example, increasing the level by a predetermined value). Alternatively, the HARQ process may refer to a HARQ configuration, such as a number of HARQ repetitions to be used when HARQ is enabled between the UE 200 and the target gNB 300. For example, as discussed above, statistical values of the probable MCS level shifts achievable by a given number of HARQ repetitions are well known, and so the source gNB 100 may use this information to determine a higher MCS level in consideration of HARQ being enabled after the handover.

Once the MCS level is determined in step 535, the MCS level is notified to the UE 200, for example by DCI. In an example, a DCI message including the MCS level may be conveyed through the PDCCH. The UE 200 may use the notified MCS level, in combination with a probable MCS level estimated by the UE 200, to determine if HARQ is to be enabled. For example, as discussed above, if the UE 200 determines that the notified MCS level from the source gNB 100 is higher than the MCS level estimated by UE 200, then the UE 200 may infer that HARQ is to be enabled after handover is completed.

It will be appreciated that steps 530 and 535 may be performed in parallel or in the reverse order to as shown in FIG. 3.

If the explicit notification method is to be used, in step 540 the source gNB 100 indicates to the target gNB 300 that HARQ should be used for communication with the UE 200 once the handover is complete. This step may be performed in a similar manner to as described in step 530.

Additionally, in step 545, the source gNB 100 notifies the UE 200 that HARQ will be used/enabled after the handover is completed. For example, the source gNB 100 may transmit, to the UE 200, an indication that HARQ is to be enabled after the handover, where this indication may be included in RRC messaging transmitted to the UE 200. In an example, an RRC message including the indication to use HARQ may be conveyed through the PDCCH.

It will be appreciated that steps 540 and 545 may be performed in parallel or in the reverse order to as shown in FIG. 3.

Following the performance of the implicit notification method or the explicit notification method, the method ends (as referred to by step 560). Step 560 may therefore refer to steps related to completing the handover process such as one or more of those described in relation to step 550. In this regard, it will be appreciated that the relevant ones of steps 525, 530, 535, 540, 545 are performed in addition to performing the handover procedure described above in relation to step 550. That is, the decision to enable HARQ between the UE 200 and the target gNB 300 does not modify the standard handover procedure or prevent the performing of the standard handover procedure—instead steps 530-535, or 540-545 as the case may be, may be performed in parallel with performing the handover procedure, for example.

Accordingly, in certain embodiments of the present disclosure, when performing step 520 and then the relevant ones of steps 525-545 (depending on whether step 525 is performed and whether explicit notifying or implicit notifying is used), the source gNB 100 may also be performing one or more of the handover steps described in combination with step 550, so long as the handover process is not completed before the UE 200 and the target gNB 300 have been notified to use HARQ once the handover is complete. The latter is to ensure that HARQ is enabled for the very first packets sent from the target gNB 300 to the UE 200 after the handover, thereby increasing QoS following the performing of the forced handover. Alternatively, if the source gNB 100 has performed all operations related to the handover, it may still be the case that the handover is not completed until the UE 200, the target gNB 300 and/or the core network have performed one or more steps such as outlined above in relation to step 520, and so the use of HARQ after the handover is completed may still be notified before the handover is completed.

FIG. 4 illustrates a method of an NTN comprising a source gNB 100, a UE 200 and a target gNB 300 in accordance with an embodiment of the present disclosure. Furthermore, it will be appreciated that separate embodiments of present disclosure relate to the operations or methods of each of the source gNB 100, the UE 200 and the target gNB 300.

In step 610 the source gNB 100 is triggered to perform a forced handover. It will be appreciated that this step may be similar to step 510 of FIG. 3.

In step 620, the process of performing a handover of the UE 200 from the source gNB 100 to the target gNB 300 is initiated. This process may be in accordance with that described above, and may begin, for example, with the source gNB 100 sending a handover request to the target gNB 300. It will be appreciated that the handover process continues while steps 630 to 660 are performed.

In step 630 it is assumed, for the sake of this example, that the source gNB 100 has determined that HARQ should be enabled after the handover is complete. However, it will be appreciated that this step may include a determination along the lines of step 520 of FIG. 3, as it may not always be necessary to enable HARQ after handover (as may be the case if the signal strength for the cell of the target gNB is above a threshold).

In step 640, the source gNB 100 notifies both the target gNB 300 and the UE 200 that HARQ is to be used after the handover is completed. These notifications may be provided in parallel or in sequence (in any order). To notify the UE 200, the source gNB 100 may use the implicit notification method or the explicit notification method, as described above. It will be appreciated that this step may be similar to either the combination of steps 525 and 530-535 or the combination of steps 525 and 540-545 of FIG. 3.

In step 650, the UE 200 receives the corresponding notification from the source gNB 100 and so may determine that HARQ is to be used after the handover to the target gNB 300 is complete. Depending on the notification method, the UE 200 may receive an indication that HARQ is to be used, or the UE 200 may receive an information from which the UE may infer that HARQ is to be used, as described above.

In step 660, the target gNB 300 receives the corresponding notification from the source gNB 100, and so may determine that HARQ is to be used once handover of the UE 200 is completed. Steps 650 and 660 may occur in either order or simultaneously.

Step 670 signifies that the handover process is completed after the UE 200 and the target gNB 300 have been notified, and have determined, that HARQ is to be used after the handover is completed. Accordingly, HARQ is enabled for the first packets transmitted between the target gNB 300 and the UE 200.

FIGS. 5 and 6 described below illustrate the general operation of a UE and a gNB when implementing any of the above-described configurations and methods.

FIG. 5 provides a schematic diagram of the structure of a gNB 700 which is arranged to operate in accordance with the examples described above; for example, the gNB 700 may be in accordance with the source gNB 100 or the target gNB 300. The gNB 700 includes a transmitter 702 arranged to transmit signals to a UE; a receiver 704 arranged to receive signals from a UE; and a controller 706 arranged to control the transmitter and receiver and to perform processing such as in accordance with the above described methods, and also to communicate with the core network.

FIG. 6 provides a schematic diagram of the structure of a UE 800 which is arranged to operate in accordance with the examples of the present disclosure described above; for example, the UE 800 may be in accordance with the UE 200. The UE 800 includes a transmitter 802 arranged to transmit signals to one or more gNBs; a receiver 804 arranged to receive signals from one or more gNBs; and a controller 806 arranged to control the transmitter and receiver and to perform processing in accordance with the above described methods.

Although in FIGS. 5 and 6 the transmitter, receiver, and controller have been illustrated as separate elements, any single element or plurality of elements which provide equivalent functionality may be used to implement the examples of the present disclosure described above.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. Examples of the present disclosure extend to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the invention, which is defined in the accompanying claims.

The invention claimed is:

1. A method of a first base station for supporting a handover procedure, the method comprising:
   determining to perform a handover of a user equipment (UE) to a second base station;
   determining whether Hybrid automatic repeat request (HARQ) is to be used after the handover is completed; and
   based on determining that HARQ is to be used, notifying the UE that HARQ is to be used after the handover is completed and notifying the second base station that HARQ is to be used after the handover is completed.

2. The method of claim 1, wherein the handover is a time limited handover or a forced handover,
   wherein determining to perform handover comprises determining the second base station based on information received from the UE, and
   wherein the information comprises measurements of at least one neighboring cell signal strength, the measurements including a measurement of signal strength of a cell corresponding to the second base station.

3. The method of claim 2, wherein notifying the UE that HARQ is to be used after handover is completed comprises one of:
   transmitting, to the UE, an indication that HARQ is to be used after the handover is completed; and
   determining configuration information based on the information of the signal strength of the cell corresponding to the second base station and a HARQ process, and transmitting, to the UE, the configuration information,
   wherein the indication is included in a Radio Resource Control (RRC) message, the RRC message being transmitted to the UE after the first base station transmits a handover request to the UE,
   wherein the configuration information is a Modulation Coding Scheme (MCS) level which is transmitted to the UE through a Downlink Channel Information (DCI) message, the DCI message being transmitted to the UE after the first base station transmits a handover request to the UE,
   wherein determining the configuration information comprises setting the MCS level to be higher than an MCS level determined based on only the information of the signal strength of the cell corresponding to the second base station, and
   wherein the one of the RRC messaging and the MCS level is transmitted through a Physical Downlink Control Channel (PDCCH).

4. The method of claim 2, wherein determining whether HARQ is to be used comprises determining the signal strength of the cell corresponding to the second base station to be less than a threshold, and
wherein the threshold is based on a signal strength of a cell corresponding to the first base station.

5. A method of a user equipment (UE) for supporting a handover procedure, the method comprising:
receiving, from a first base station, a notification that Hybrid automatic repeat request (HARQ) is to be used after a handover to a second base station is completed;
transmitting, to the second base station, a handover complete message; and
communicating with the second base station with HARQ enabled.

6. The method of claim 5, wherein receiving the notification that HARQ is to be used after the handover to the second base station is completed comprises:
receiving, from the first base station, a Modulation Coding Scheme (MCS) level;
determining a probable MCS level based on information of the signal strength of a cell corresponding to the second base station;
comparing the received MCS level with the probable MCS level; and
based on the comparison, determining that HARQ is to be used after the handover is completed, and
wherein the information of the signal strength is measured by the UE.

7. A method of a second base station for supporting a handover procedure, the method comprising:
receiving, from a first base station, an notification that Hybrid automatic repeat request (HARQ) is to be used after handover of a user equipment (UE) from the first base station to the second base station is completed;
receiving, from the UE, a handover complete message; and
communicating with the UE with HARQ enabled.

8. A first base station for supporting a handover procedure, the first base station comprising:
a transceiver; and
a controller configured to:
determine to perform a handover of a user equipment (UE) to a second base station,
determine whether Hybrid automatic repeat request (HARQ) is to be used after the handover is completed, and
based on determining that HARQ is to be used, notify the UE that HARQ is to be used after the handover is completed and notifying the second base station that HARQ is to be used after the handover is completed.

9. The first base station of claim 8, wherein the handover is a time limited handover or a forced handover,
wherein the controller is configured to determine the second base station based on information received from the UE, and
wherein the information comprises measurements of at least one neighboring cell signal strength, the measurements including a measurement of signal strength of a cell corresponding to the second base station.

10. The first base station of claim 9, wherein the controller is configured to:
transmit, to the UE, an indication that HARQ is to be used after the handover is completed, and
determine configuration information based on the information of the signal strength of the cell corresponding to the second base station and a HARQ process, and transmitting, to the UE, the configuration information,
wherein the indication is included in a Radio Resource Control (RRC) message, the RRC message being transmitted to the UE after the first base station transmits a handover request to the UE, and
wherein the configuration information is a Modulation Coding Scheme (MCS) level which is transmitted to the UE through a Downlink Channel Information (DCI) message, the DCI message being transmitted to the UE after the first base station transmits a handover request to the UE.

11. The first base station of claim 9, wherein the controller is configured to set the MCS level to be higher than an MCS level determined based on only the information of the signal strength of the cell corresponding to the second base station, and
wherein the one of the RRC messaging and the MCS level is transmitted through a Physical Downlink Control Channel (PDCCH).

12. The first base station of claim 9, wherein the controller is configured to determine the signal strength of the cell corresponding to the second base station to be less than a threshold, and
wherein the threshold is based on a signal strength of a cell corresponding to the first base station.

13. A user equipment (UE) for supporting a handover procedure, the UE comprising:
a transceiver; and
a controller configured to:
receive, from a first base station, a notification that Hybrid automatic repeat request (HARQ) is to be used after a handover to a second base station is completed,
transmit, to the second base station, a handover complete message, and
communicate with the second base station with HARQ enabled.

14. The UE of claim 13, wherein the controller is configured to:
receive, from the first base station, a Modulation Coding Scheme (MCS) level,
determine a probable MCS level based on information of the signal strength of a cell corresponding to the second base station,
compare the received MCS level with the probable MCS level, and
based on the comparison, determining that HARQ is to be used after the handover is completed, and
wherein the information of the signal strength is measured by the UE.

15. A second base station for supporting a handover procedure, the second base station comprising:
a transceiver; and
a controller configured to:
receive, from a first base station, an notification that Hybrid automatic repeat request (HARQ) is to be used after handover of a user equipment (UE) from the first base station to the second base station is completed,
receive, from the UE, a handover complete message, and
communicate with the UE with HARQ enabled.

* * * * *